United States Patent [19]

Opdahl

[11] Patent Number: 4,890,751

[45] Date of Patent: Jan. 2, 1990

[54] DEPLOYMENT/RETRIEVAL SYSTEM

[75] Inventor: Everett W. Opdahl, Lutherville, Md.

[73] Assignee: Westinghouse Electric Corp., Pittsburgh, Pa.

[21] Appl. No.: 588,594

[22] Filed: Mar. 12, 1984

[51] Int. Cl.⁴ .......................................... B66C 13/00
[52] U.S. Cl. ............................... 212/271; 244/1 TD; 258/1.2
[58] Field of Search ........... 244/1 TD, 137 R, 137 A, 244/137 L; 258/1.2; 254/326, 335, 413, 415; 212/213, 219, 220, 221; 114/244, 253, 254

[56] References Cited

U.S. PATENT DOCUMENTS

| | | | |
|---|---|---|---|
| 2,284,532 | 5/1942 | Napier | 254/335 |
| 3,494,443 | 2/1970 | Huffhines | 212/193 |
| 3,536,298 | 10/1970 | Deslierres | 114/254 |
| 3,604,387 | 9/1971 | Hale | 114/254 |
| 3,865,065 | 2/1975 | Dennis et al. | 114/210 |
| 4,072,123 | 2/1978 | Byers | 114/254 |
| 4,304,189 | 12/1981 | Wright | 114/254 |
| 4,349,180 | 9/1982 | Charles et al. | 114/254 |

Primary Examiner—Joseph F. Peters, Jr.
Assistant Examiner—Thomas J. Brahan
Attorney, Agent, or Firm—D. Schron

[57] ABSTRACT

A deployment/retrieval system for a towed body which includes first and second arms, one of which is rotatable relative to the other about an axle disposed beneath the longitudinal axes of the arms. A winch-wound cable passes through both of the arms as well as around a sheave which also rotates about the axle. Prior to deployment or after retrieval of the towed body the arms are in a horizontal position while during deployment or a retrieval one arm is in a vertical position. When in the vertical position, a complementary mating arrangement on the towed body ensures for a positive engagement with the arm so as to prevent excessive movement of the towed body when captured. In order to reduce tension on the cable for irregular movements of the towing body, one arm assembly is affixed in a bearing arrangement so as to allow rotation about its longitudinal axes.

15 Claims, 8 Drawing Sheets

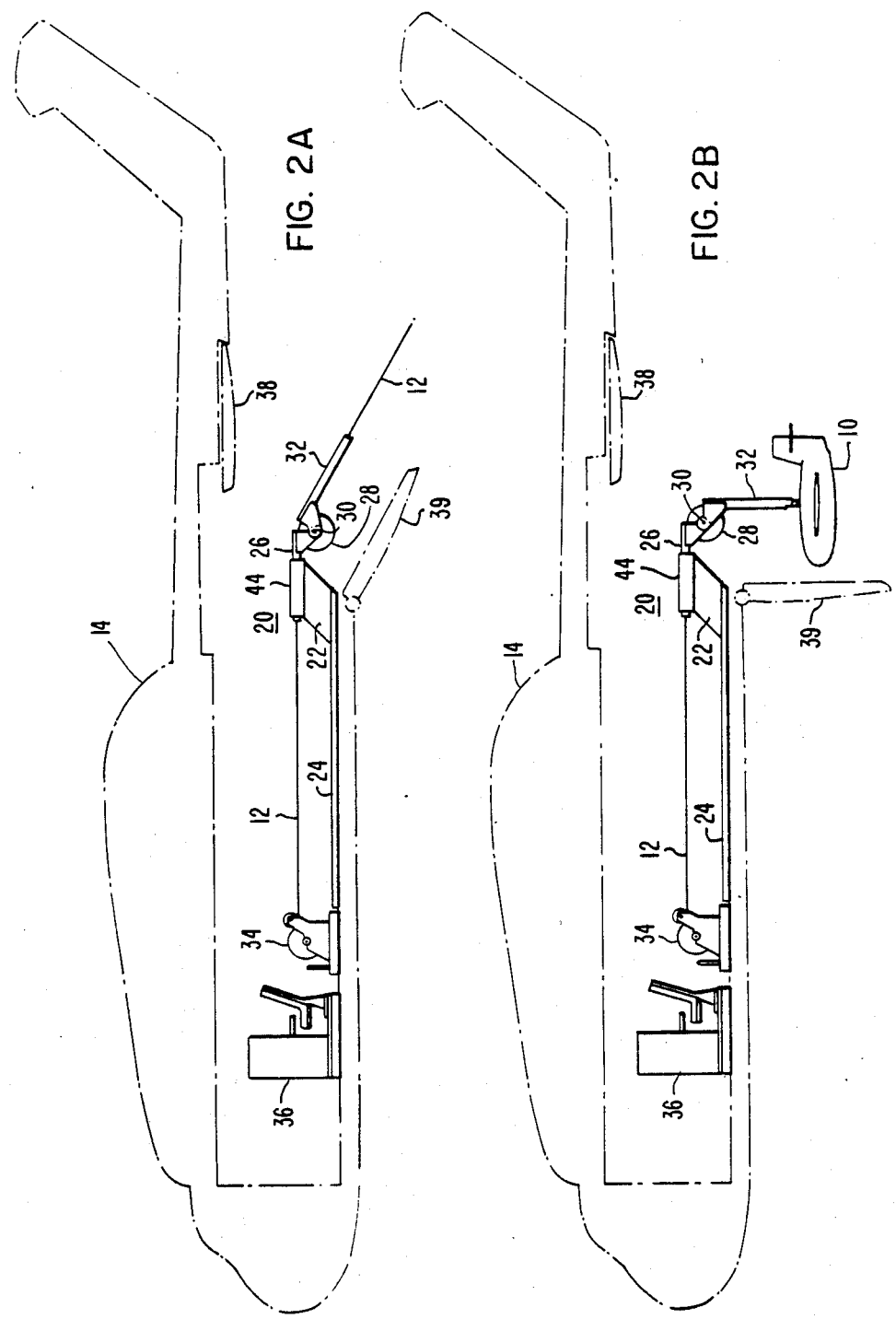

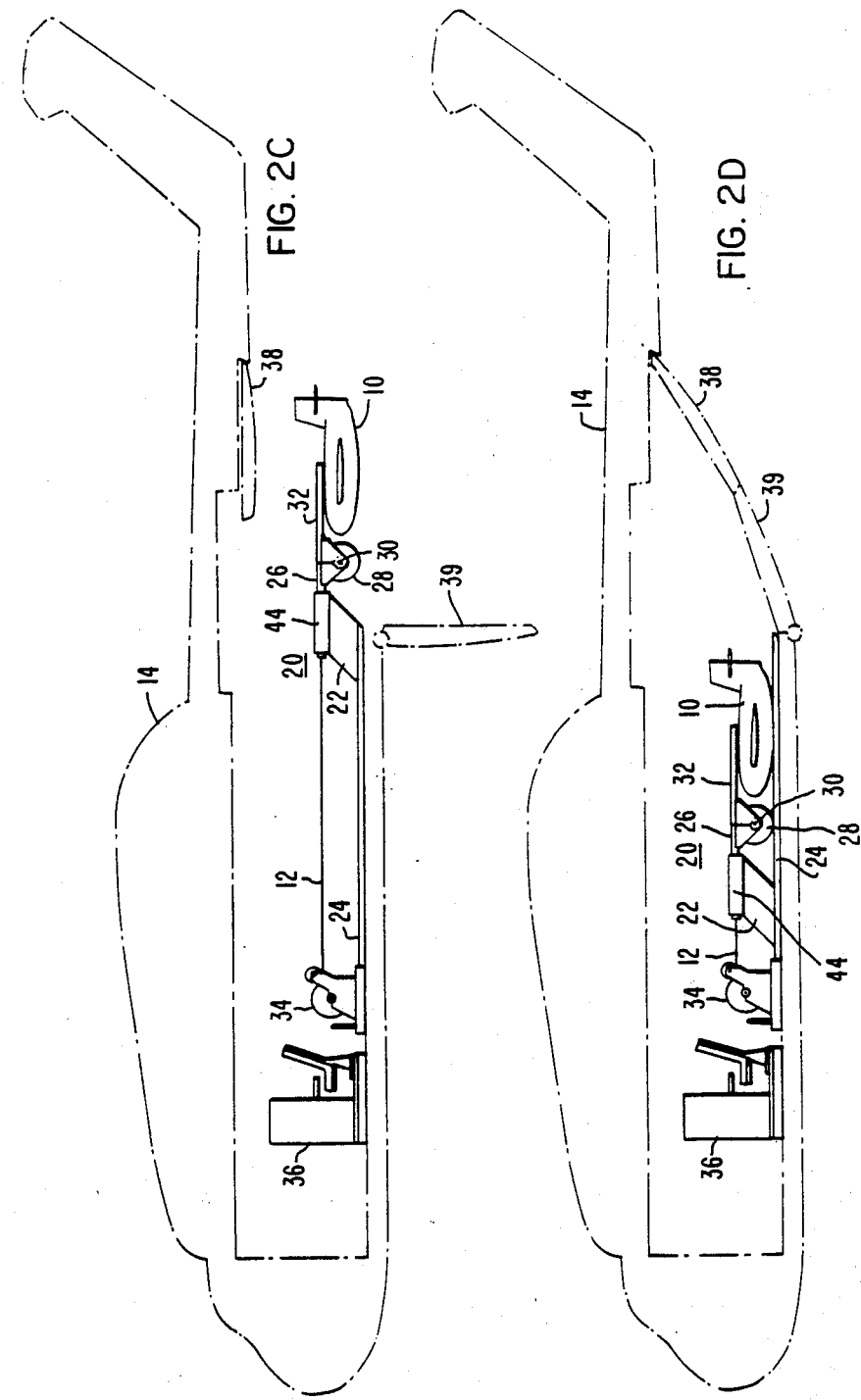

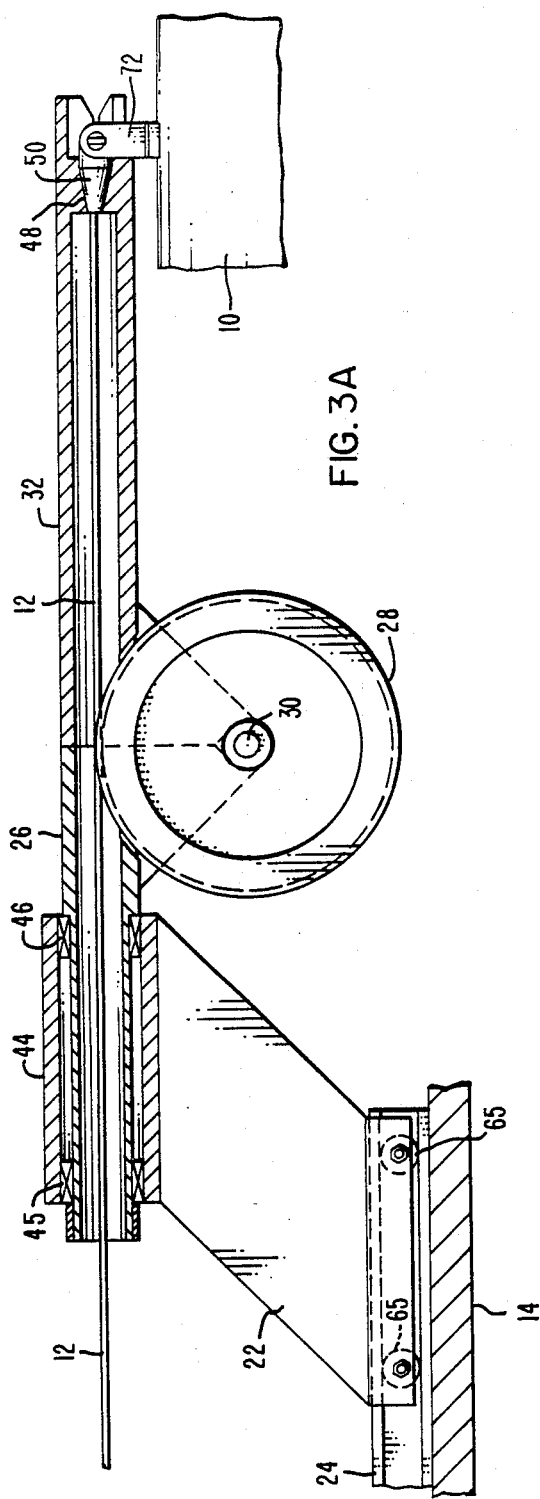
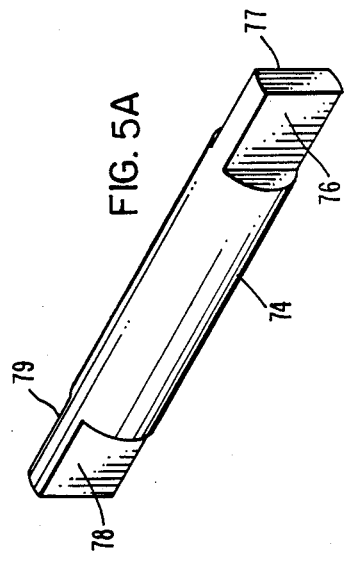
FIG. 3A
FIG. 5A

4,890,751

DEPLOYMENT/RETRIEVAL SYSTEM

BACKGROUND OF THE INVENTION

The Government has rights in this invention pursuant to contract General Order No. 39614 awarded by the Department of the Navy.

FIELD OF THE INVENTION:

The invention in general relates to towed bodies and more particularly to a system for the launching and retrieval of the body.

DESCRIPTION OF THE PRIOR ART:

Many underwater data gathering systems exist which incorporate a towed underwater vehicle operative as an instrumentation platform. The vehicle which tows the underwater body in many instances is a surface vessel which deploys and retrieves the towed body over the stern with the use of a tow boom. The towing cable passes from an on board winch over a boom-carried sheave generally located high above the ship's center of roll thereby introducing undesirable lateral displacements to the cable when the ship rolls.

In such systems it is generally desirable to bring the vehicle through the air/sea interface while secured to the handling apparatus so as to avoid any uncontrolled pendulum action of the towed body and which action is a hazard to personnel and could cause equipment damage. In order to accomplish this securing action the boom generally requires articulation which further increases the weight and complexity of the system.

Other types of towing vehicles may have a space constraint so as to preclude the use of a boom-type system. For example, helicopters are often utilized as the towing vehicle with deployment and retrieval of the towed body being accomplished through a rear cargo door arrangement. The relatively low clearance in the helicopter requires a deployment/retrieval system which has a low profile to meet the space requirements and a positive capture arrangement to prevent excessive pendulum action of the towed body when bringing it on board the helicopter. The present invention provides a system which meets these objectives.

SUMMARY OF THE INVENTION

The system includes a base member which supports a first hollow arm and is preferably arranged so as to slide along a track. A sheave member is positioned so as to rotate about an axis disposed below the arm. A second hollow arm is provided and is rotatable about the sheave member between a first position wherein the longitudinal axes of the first and second arms are aligned, and a vertical position. A cable wound upon a winch extends through the first and second arms and is operable to contact the sheave during rotation of the second arm, with the cable being connected at its other end to a tethered body.

Prior to deployment of the tethered body the first and second arms are aligned and the apparatus is positioned at a location for deployment. The arms, which may be locked in position, are released so as to allow the second arm to rotate to a vertical position whereupon the cable may be played out over the sheave. Upon retrieval, the operational steps are reversed.

BRIEF DESCRIPTION OF THE DRAWINGS

FIGS. 2A through 2D illustrate the towed body deployment from the towing vehicle of FIG. 1;

FIGS. 3A and 3B are views, partially in section, illustrating further details of the system;

FIG. 5A illustrates further details of the cross pin member of FIG. 5;

DESCRIPTION OF THE PREFERRED EMBODIMENT

Figure 1:
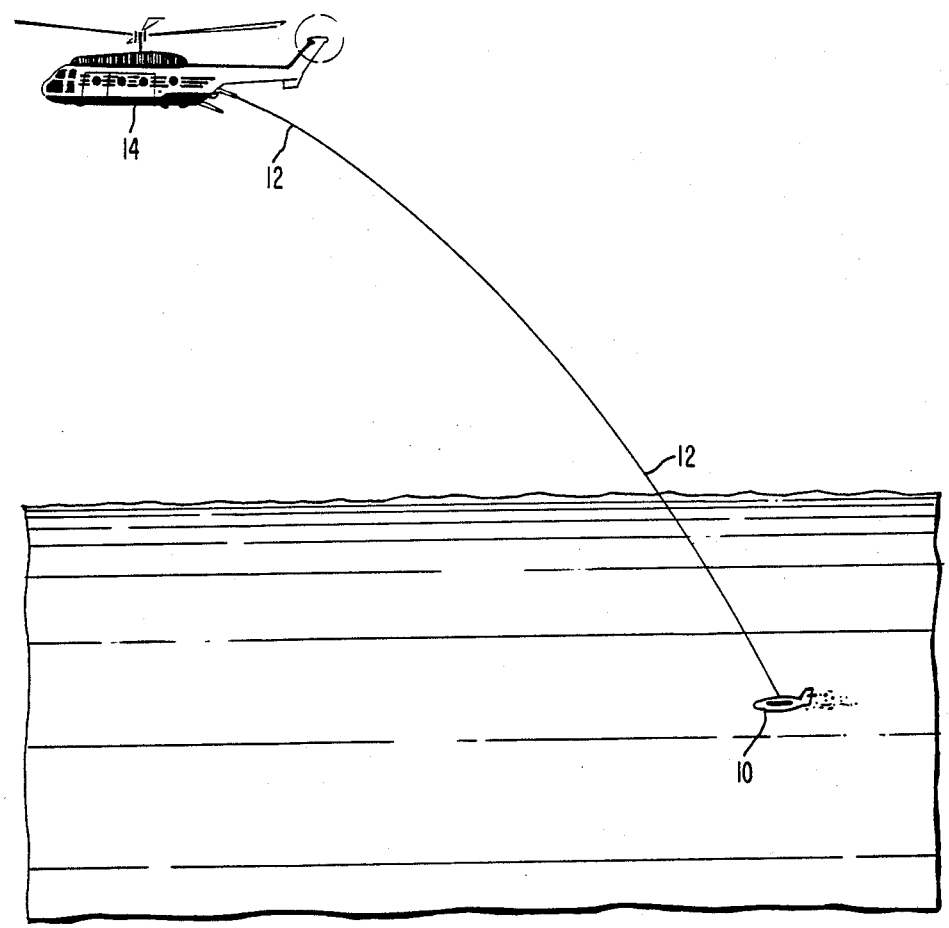
FIG. 1 illustrates a typical use for a towed body deployment/retrieval system.

Referring now to FIG. 1 there is illustrated a towed body 10 of the underwater type which carries one or more instrumentation packages for gathering data. The data signals may be stored on board the towed body or, more commonly, transmitted up an electromechanical tow cable 12 to the towing vehicle 14 shown as a helicopter for illustrative purposes. After completion of the mission, the towed body is retrieved and placed on board the towing vehicle as depicted in FIGS. 2A through 2D, to which reference is now made.

The deployment/retrieval system 20 which is shown in the interior of the helicopter includes a base member 22 which for convenience is movable along a track 24. Base 22 supports a first hollow arm 26 which in turn carries a sheave 28 rotatable about axle 30 disposed below the arm 26. A second hollow arm 32 constituting a cable follower arm is rotatable about sheave 28 and axle 30 between a first position wherein the longitudinal axes of the first and second arms are aligned, and a second position which is a vertical position.

Cable 12 passes through arm 32, over sheave 28, through arm 26 and is wound upon a winch 34 at the other end of track 24 and located near an operator's console 36.

Helicopter cargo doors 38 and 39 are illustrated for the towing position. Once the towed body passes the air/sea interface, or even prior thereto, cargo door 38 assumes the position as illustrated in FIG. 2B and arm 32 assumes the vertical position so that the towed body 10 may be reeled in and captured.

Once the capture has taken place, as will be subsequently explained, the cable is further reeled in to thereby bring arm 32 to the horizontal position illustrated in FIG. 2C whereupon the two arms may be latched together so as to relieve some of the tension on the cable 12.

After capture, and as illustrated in FIG. 2D, the assembly is moved along the track to the interior of the helicopter whereupon the cargo doors 38 and 39 may be closed. Deployment of the towed body 10 can be accomplished by reversing the sequence of operation illustrated in FIGS. 2A through 2D.

Figure 3B:
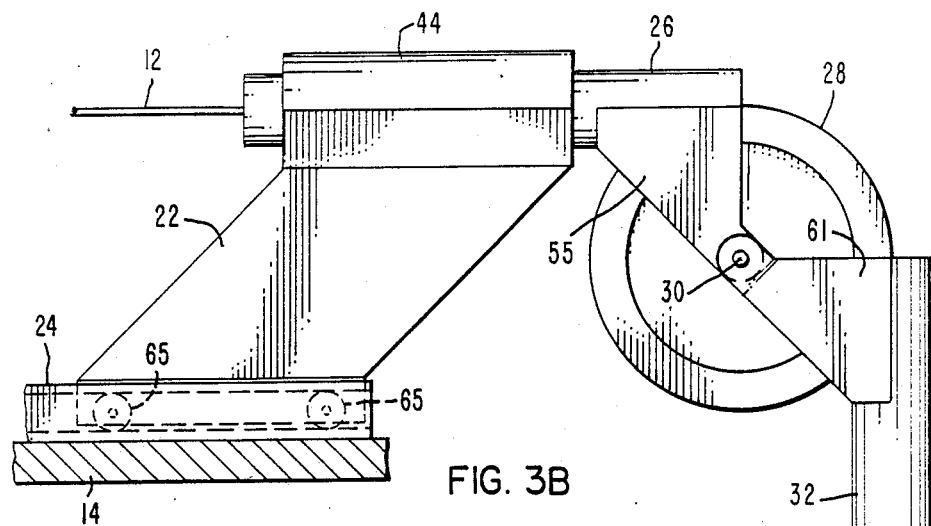
Figure 4:
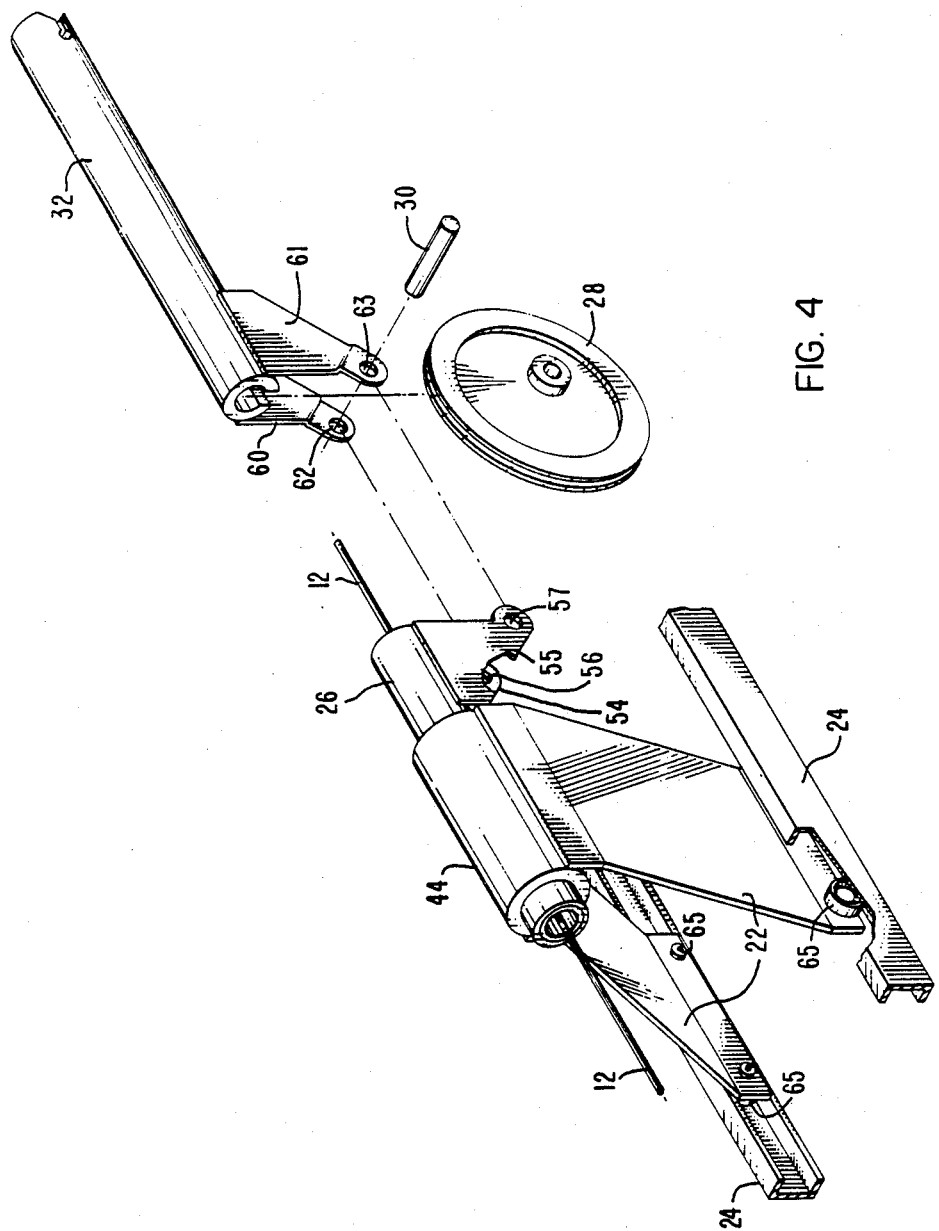
FIG. 4 is an exploded view of the system.

Further details of the system are illustrated in FIG. 3A which illustrates arm 32 in a first position aligned with arm 26, FIG. 3B which shows arm 32 in a second or vertical position and FIG. 4 which illustrates and exploded view of the various components.

In FIG. 3A arms 26 and 32 are shown in longitudinal cross section and it is seen that arm 26 is supported in a bearing member 44 supported at the top of base member 22. The bearing member includes bearings 45 and 46 at either end thereof to permit arm 26 to swivel about its longitudinal axis thereby permitting sheave 28, connected to arm 26, to follow the cable and to reduce the effects of lateral load on the cable due to aircraft maneuvering such as roll and yaw motion.

Tow cable 12 passes through arm 26 and is tangent to sheave 28 when arms 26 and 32 are aligned. When in an unlatched position, arm 32 pivots around the sheave axle 30 and in so doing, cable 12 contacts more of the sheave surface. The far, or distal end of arm 32 has the internal portion thereof shaped so as to form a socket 48 which mates and conforms to the shape of cable termination 50.

As best seen in FIG. 4, support plates 54 and 55 are affixed to and extend below arm 26 and include apertures 56 and 57 through which passes axle 30 upon which sheave 28 rotates.

In a similar fashion, support plates 60 and 61 are attached to arm 32 and include apertures 62 and 63 through which axles 30 passes to allow rotation of arm 32 about the axle.

Tracks 24 engage with wheels 65 on the base member so as to allow movement of the system from a retracted to an operational position. Depending upon the towing vehicle, the track arrangement may not be an absolute necessity and although wheels are illustrated other types of sliding engagement members may be utilized.

Figure 5:
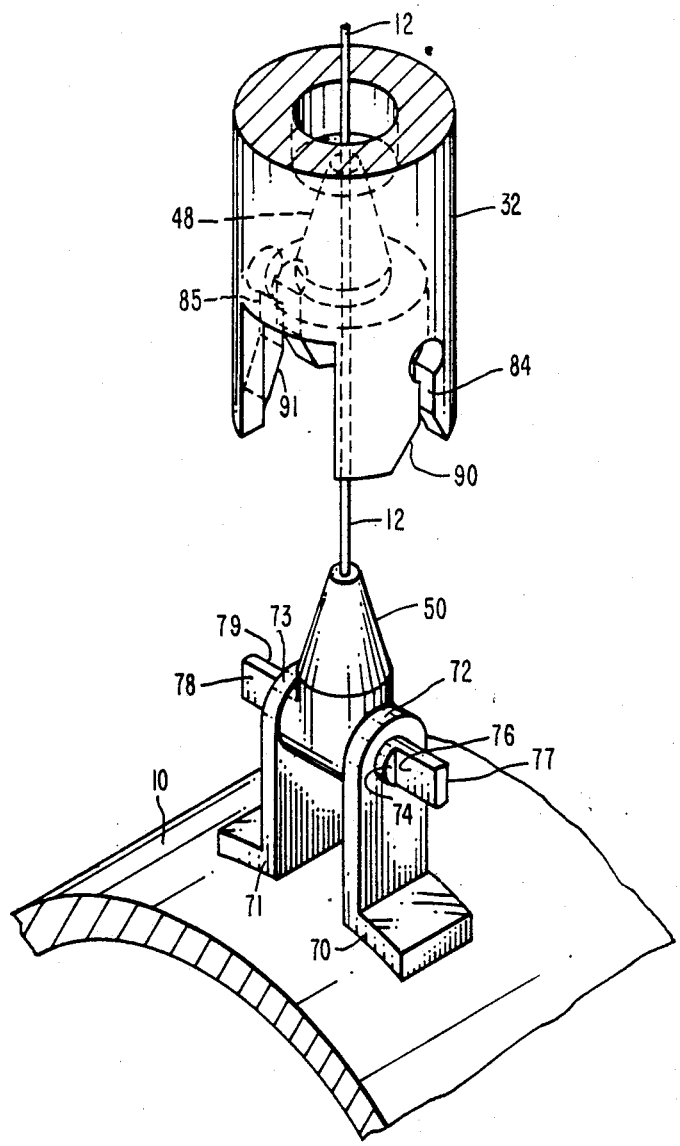
FIG. 5 further illustrates details of the towing cable termination and its connection to the towed body.

FIG. 5 further shows the cable termination and its connection to the towed body. A pair of brackets 70 and 71 secured to the towed body 10 include respective upright portions 72 and 73 having apertures through which a cross-pin member 74 extends, and about which cable termination 50 pivots.

As best seen in FIG. 5A, cross-pin member 74 is in the form of a cylindrical rod having at either end two diametrically opposed flattened surfaces 76, 77 and 78, 79. These flattened surfaces match with respective keyhole slots 84 and 85 (FIG. 5) at the distal end of arm 32, this operation being described in FIGS. 6A through 6E to which additional reference is made.

Figure 6A:
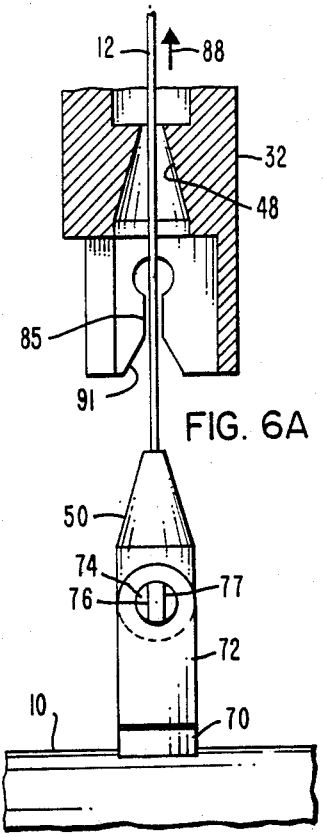
FIGS. 6A through 6E illustrate the engagement sequence for retrieving the towed body.

With arm 32 in the vertical position, and cable 12 being moved in the direction as indicated by arrow 88, towed body 10 approaches the distal end of the arm as illustrated in section in FIG. 6A. Flattened surfaces 76, 77 will engage the keyhole slot 84, and flattened surfaces 78, 79 will engage the keyhole slot 85 and in order to facilitate this engagement the distal end of arm 32 includes flared cutout portions 90, 91 (best seen in FIG. 5), so as to accommodate for misalignments, to thereby guide the mating cross-pin member into the keyhole slot as illustrated in FIG. 6B.

Figure 6B:
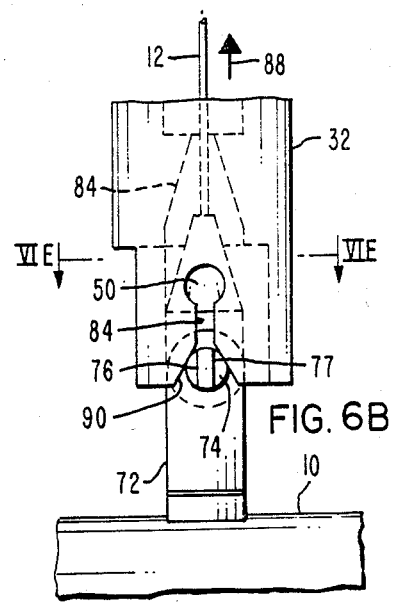
Figure 6C:
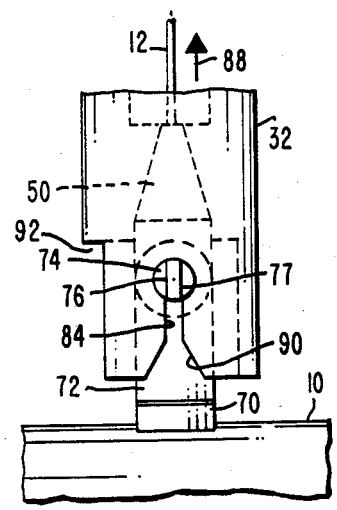
Figure 6D:
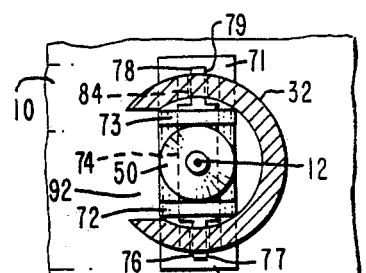

As seen in FIG. 6B, the distance between flattened surfaces 76 and 77 is slightly less than the width of the rectangular portion of the keyhole slot such that further retrieval will bring the end of the cross-pin member into the circular portion of the keyhole slot as illustrated in FIG. 6C.

Figure 6E:
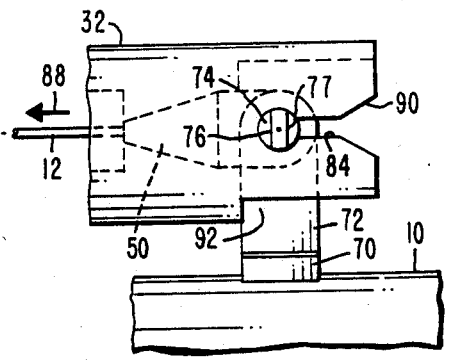

Continued retrieval will then cause arm 32 to rotate about the sheave axle to a horizontal position where it may be latched to arm 26. The arm includes a notch portion 92, best seen in the sectional plan view of FIG. 6D, to accommodate the brackets 70 and 71 upon rotation. The final position is illustrated in FIG. 6E and it is seen that due to the diameter of the cross-pin member a positive locking is effected by means of the keyhole slot arrangement whereupon the system may be withdrawn into the body of the towing vehicle. for a subsequent deployment, the steps illustrated in FIGS. 6A through 6E would be reversed with the unlatching between the first and second arms 26 and 32 being accomplished remotely by the operator such as by electrical means.

Figure 7:
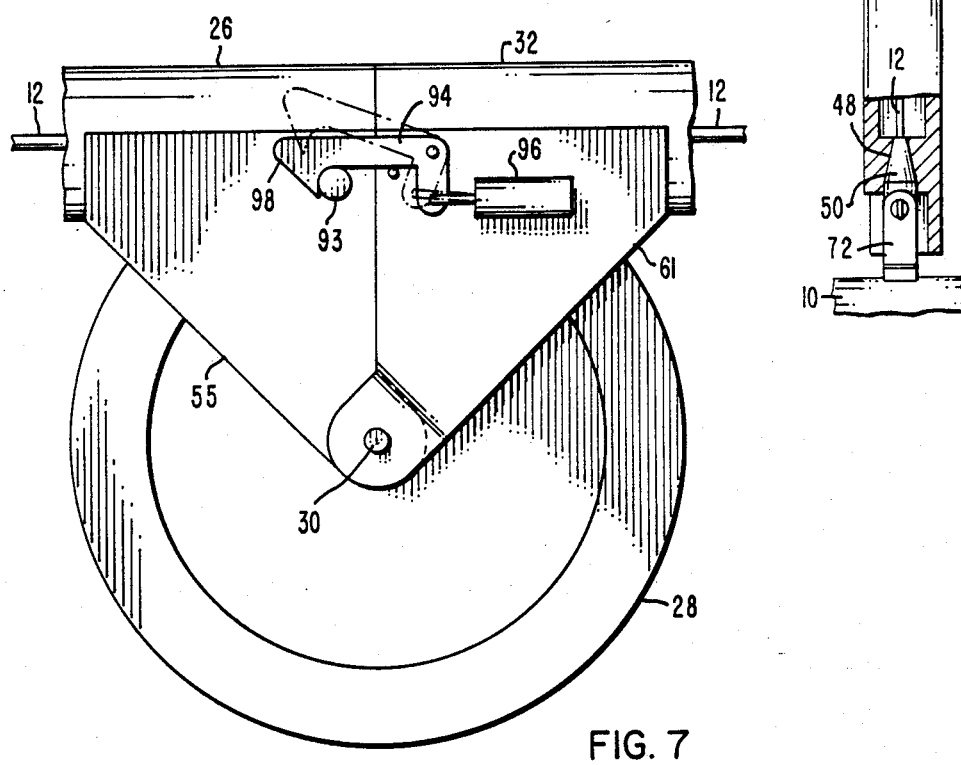
FIG. 7 illustrates one form of latching arrangement which is utilized in the system.

One type of latching arrangement which may be utilized herein is illustrated in FIG. 7 wherein it is seen that one arm includes a latch pin 93 while the other arm includes a latching arm assembly 94 which is activated by means of solenoid 96. When the deployment is to take place, the operator may activate the solenoid causing the latching arm assembly to disengage from latch pin 93 so that arm 32 is free to rotate about the sheave 28. Upon retrieval, cam surface 98 of the latching arm assembly 94 will initially contact latch pin 93, ride its surface, and automatically latch in place as the two arms 26 and 32 contact one another.

What I claim is:

1. A deployment/retrieval system for a tethered body comprising:
   (A) a base member;
   (B) a first elongated hollow arm having a longitudinal axis and supported by said base member;
   (C) a sheave member rotatable about an axle spaced from and disposed a predetermined distance below said first arm;
   (D) a second elongated hollow arm having a longitudinal axis and rotatable about said axle, between a first position wherein the longitudinal axes of said first and second arms are aligned, and a vertical position;
   (E) a winch;
   (F) a cable wound upon said winch and extending through said first and second arms and operable to contact said sheave during rotation of said second arm; and
   (G) a tethered body connected to the end of said cable.

2. Apparatus according to claim 1 which includes:
   (A) bearing means carried by said base member; and
   (B) said first arm being supported by said bearing means to allow said arm to swivel about its longitudinal axis.

3. Apparatus according to claim 1 which includes:
   (A) a track arrangement; and
   (B) said base member being adapted for movement along said track arrangement.

4. Apparatus according to claim 3 wherein:
   (A) said track arrangement includes spaced apart tracks; and
   (B) said base member includes wheels for engagement with said tracks.

5. Apparatus according to claim 1 which includes:
   (A) spaced apart support plates depending from and extending below said first arm;
   (B) said axle extending between said support plates; and
   (C) said sheave member being rotatable about said axle.

6. Apparatus according to claim 5 which includes:
   (A) spaced apart support plates depending from said second arm and including apertures into which said axle extends to thereby allow rotation of said second arm about said axle.

7. Apparatus according to claim 1 wherein:
   (A) said sheave is circular.

8. Apparatus according to claim 1 wherein:
(A) said cable is tangent to said sheave when said second arm is in said first position.

9. A deployment/retrieval system for a tethered body comprising:
(A) a base member;
(B) a first elongated hollow arm having a longitudinal axis and supported by said base member;
(C) a sheave member rotatable about an axle dispoed below said first arm;
(D) a second elongated hollow arm having a longitudinal axis and rotatable about said axle, between a first position wherein the longitudinal axes of said first and second arms are aligned, and a vertical position;
(E) a winch;
(F) a cable wound upon said winch and extending through said first and second arms and operable to contact said sheave during rotation of said second arm;
(G) a tethered body connected to the end of said cable; and
(H) latch means for latching said first arm to said second arm when said first arm is in said first position.

10. Apparatus according to claim 9 which includes:
(A) means for electrically deactivating said latch means so as to allow for said rotation of said second arm.

11. Apparatus according to claim 1 which includes:
(A) a cable termination pivotally connected to said tethered body and pivotable about a cross-pin member.

12. Apparatus according to claim 11 wherein:
(A) the internal portion of the distal end of said second arm is of a shape so as to mate with said cable termination.

13. A deployment/retrieval system for a tethered body comprising:
(A) a base member;
(B) a first hollow arm supported by said base member;
(C) a sheave member rotatable about an axis disposed below said first arm;
(D) a second hollow arm rotatable about said sheave member between a first position wherein the longitudinal axes of said first and second arms are aligned, and a vertical position;
(E) a winch;
(F) a cable wound upon said winch and extending through said first and second arms and operable to contact said sheave during rotation of said second arm;
(G) a tethered body connected to the end of said cable;
(H) a cable termination pivotally connected to said tethered body and pivotable about a cross-pin member;
(I) the internal portion of the distal end of said second arm being of a shape so as to mate with said cable termination;
(J) said distal end of said second arm including diametrically opposed cut-out portions; and
(K) said cut-out portions being a fixed notch means, and said cut-out portions and said cross-pin member being sized and shaped so as to allow their mating and unmating when said second arm is in a vertical position and to hold said cross-pin member when said second arm is in said first position.

14. Apparatus according to claim 13 wherein:
(A) said cut-out portions are first and second keyhole slots;
(B) the portion of said cross-pin member which mates with a keyhole slot is a cylindrical rod having two diametrically opposed flattened surfaces.

15. Apparatus according to claim 14 wherein:
(A) the distal end of said second arm includes respective flared cut-out portions terminating in said first and second keyhole slots so as to guide the mating cross-pin member into said slots when said body is retrieved.

* * * * *